United States Patent
Price et al.

(10) Patent No.: US 11,440,259 B2
(45) Date of Patent: Sep. 13, 2022

(54) RESIN RECLAMATION CENTRIFUGE ROTOR FOR ADDITIVELY MANUFACTURED OBJECTS

(71) Applicant: Carbon, Inc., Redwood City, CA (US)

(72) Inventors: R. Griffin Price, Redwood City, CA (US); Edwin James Sabathia, Jr., Hollister, CA (US); Bob E. Feller, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 4 days.

(21) Appl. No.: 17/158,197

(22) Filed: Jan. 26, 2021

(65) Prior Publication Data
US 2021/0237358 A1   Aug. 5, 2021

Related U.S. Application Data

(60) Provisional application No. 62/968,446, filed on Jan. 31, 2020.

(51) Int. Cl.
| | | |
|---|---|---|
| *B29C 64/35* | (2017.01) | |
| *B33Y 40/20* | (2020.01) | |
| *B33Y 10/00* | (2015.01) | |
| *B29C 64/124* | (2017.01) | |

(52) U.S. Cl.
CPC .............. *B29C 64/35* (2017.08); *B33Y 40/20* (2020.01); *B29C 64/124* (2017.08); *B33Y 10/00* (2014.12)

(58) Field of Classification Search
CPC ....... B29C 64/35; B29C 64/124; B33Y 40/20; B33Y 10/00; B33Y 40/00; B08B 7/02
See application file for complete search history.

(56) References Cited

U.S. PATENT DOCUMENTS

| | | |
|---|---|---|
| 3,013,365 A | 12/1961 | Harper |
| 4,087,924 A | 5/1978 | Fujimoro et al. |
| 5,122,441 A | 6/1992 | Lawton et al. |
| 5,236,637 A | 8/1993 | Hull |
| 5,248,456 A | 9/1993 | Evans et al. |

(Continued)

FOREIGN PATENT DOCUMENTS

| | | |
|---|---|---|
| CN | 104303105 A | 1/2015 |
| DE | 102014010501 A1 | 1/2016 |

(Continued)

OTHER PUBLICATIONS

Dendukuri, Dhananjay, et al., "Continuous-flow lithography for high-throughput microparticle synthesis", Nature Materials, 5, 2006, 365-369.

(Continued)

*Primary Examiner* — Nahida Sultana
(74) *Attorney, Agent, or Firm* — Myers Bigel, P.A.

(57) ABSTRACT

A rotor for separating residual resin from additively manufactured objects in a centrifugal separator, the rotor including a rotor base and a plurality of engagement members configured to secure additively manufactured, light polymerized, objects to the rotor base, each object carrying unpolymerized resin on a surface thereof. The improvement includes a plurality of catch pans removably connected to the base, each catch pan configured to receive unpolymerized resin therein upon centrifugal separation of the resin from the additively manufactured, light polymerized, objects.

18 Claims, 6 Drawing Sheets

(56) References Cited

U.S. PATENT DOCUMENTS

| | | | |
|---|---|---|---|
| 5,355,638 A | 10/1994 | Hoffman | |
| 5,391,072 A | 2/1995 | Lawton et al. | |
| 5,482,659 A | 1/1996 | Sauerhoefer | |
| 7,438,846 B2 | 10/2008 | John | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,735,049 B2 | 5/2014 | Vest | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,511,546 B2 | 12/2016 | Chen et al. | |
| 9,592,539 B2 * | 3/2017 | Dunn | B08B 3/102 |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,596,755 B2 | 3/2020 | Desimone et al. | |
| 10,618,215 B2 | 4/2020 | Desimone et al. | |
| 10,913,206 B2 * | 2/2021 | Donovan | B29C 64/165 |
| 2003/0206820 A1 | 11/2003 | Keicher et al. | |
| 2004/0148048 A1 | 7/2004 | Farnworth | |
| 2004/0159340 A1 | 8/2004 | Hiatt et al. | |
| 2006/0022379 A1 | 2/2006 | Wicker et al. | |
| 2007/0179655 A1 | 8/2007 | Farnworth | |
| 2008/0087298 A1 | 4/2008 | Katou et al. | |
| 2009/0283119 A1 * | 11/2009 | Moussa | B29C 64/35 134/147 |
| 2011/0089610 A1 | 4/2011 | El-Siblani et al. | |
| 2011/0309554 A1 | 12/2011 | Liska et al. | |
| 2013/0292862 A1 | 11/2013 | Joyce | |
| 2013/0295212 A1 | 11/2013 | Chen et al. | |
| 2015/0331402 A1 | 11/2015 | Lin et al. | |
| 2015/0360419 A1 | 12/2015 | Willis et al. | |
| 2016/0137839 A1 | 5/2016 | Rolland et al. | |
| 2017/0129167 A1 | 5/2017 | Castanon | |
| 2017/0129169 A1 | 5/2017 | Batchelder et al. | |
| 2017/0173872 A1 | 6/2017 | McCall et al. | |
| 2017/0312763 A1 | 11/2017 | Mackel et al. | |
| 2018/0029311 A1 | 2/2018 | Depalma et al. | |
| 2018/0304526 A1 | 10/2018 | Feller et al. | |
| 2019/0029311 A1 | 1/2019 | Shin et al. | |
| 2019/0126547 A1 | 5/2019 | Desimone et al. | |
| 2019/0224917 A1 * | 7/2019 | Venkatakrishnan | B29C 64/259 |
| 2019/0389127 A1 | 12/2019 | Desimone et al. | |
| 2020/0139617 A1 | 5/2020 | Desimone et al. | |
| 2020/0215811 A1 * | 7/2020 | Friedrich | B33Y 10/00 |
| 2020/0337813 A1 | 10/2020 | Kirchner et al. | |
| 2021/0086450 A1 * | 3/2021 | Murillo | B08B 7/02 |
| 2021/0213675 A1 | 7/2021 | Converse et al. | |
| 2021/0323234 A1 * | 10/2021 | Day | B33Y 30/00 |

FOREIGN PATENT DOCUMENTS

| | | | |
|---|---|---|---|
| EP | 1700656 A2 | 9/2006 | |
| EP | 1700686 A2 | 9/2006 | |
| JP | 2001342204 A | 12/2001 | |
| JP | 2015120261 A | 7/2015 | |
| WO | 0172501 A1 | 10/2001 | |
| WO | 2011086450 A2 | 7/2011 | |
| WO | 2017194177 A1 | 11/2017 | |
| WO | 2018111548 A1 | 6/2018 | |
| WO | 2019209732 A1 | 10/2019 | |

OTHER PUBLICATIONS

Dendukuri, Dhananjay, et al., "Stop-flow lithography in a microfluidic device", The Royal Society of Chemistry, Lab on a Chip, 7, 2007, 818-828.

Dendurkuri, et al., ", Modeling of Oxygen-Inhibited Free Radical Photopolymerization in PDMS Microfluidic Device, Macromolecules, 2008, 41 (22), 8547-8556, published Oct. 21, 2008".

Morelli, Dean, "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.

Pan, Y, et al., "A Fast Mask Projection Stereolithography Process for Fabricating Digital Models in Minutes", J. Manufacturing Sci. and Eng. 134, Oct. 2012, 051011-1.

Stern, S. A., "The 'Barrer' Permeability Unit", Journal of Polymer Science: Part A-2, 6(11), 1968, 1933-1934.

Tumbleston, John R., et al., "Continuous liquid interface production of 3D Objects", Science, 347(6228), 2015, 1349-1352.

Yasuda, H., et al., "Permeability of Polymer Membranes to Dissolved Oxygen", Journal of Polymer Science, 4, 1966, 1314-1316.

* cited by examiner

RESIN RECLAMATION CENTRIFUGE ROTOR FOR ADDITIVELY MANUFACTURED OBJECTS

RELATED APPLICATIONS

This application claims priority from U.S. Provisional Patent Application No. 62/968,446, filed Jan. 31, 2020, the disclosure of which is incorporated by reference in its entirety.

FIELD OF THE INVENTION

The present invention concerns methods of additive manufacturing, and particularly concerns methods of extracting or removing excess resin from objects following their production by top-down or bottom-up stereolithography.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

Stereolithography resins—both conventional and dual cure—are generally viscous, and excess, unpolymerized, resin adheres to objects after they have been produced. Centrifugal separation techniques for collecting unpolymerized resin from objects have been described (see M. Murillo and G. Dachs, Resin Extractor for Additive Manufacturing, PCT Patent Application Publication No. WO 2019/209732), but these are not optimum when the amount of resin separated is small relative to the internal surface area of the centrifugal separator itself. Accordingly, there is a need for new techniques for removing excess resin from additively manufactured products.

SUMMARY OF THE INVENTION

Some embodiments of the present invention are diected to a rotor for separating residual resin from additively manufactured objects in a centrifugal separator, the rotor including a rotor base and a plurality of engagement members configured to secure additively manufactured, light polymerized, objects to the rotor base, each object carrying unpolymerized resin on a surface thereof. The improvement includes a plurality of catch pans removably connected to the base, each catch pan configured to receive unpolymerized resin therein upon centrifugal separation of the resin from the additively manufactured, light polymerized, objects.

In some embodiments, the rotor includes: (a) a rotor base configured to receive a plurality of carrier platforms, each carrier platform having a build surface, each build surface having at least one light polymerized object formed thereon from a light polymerizable resin by an additive manufacturing process, each object carrying unpolymerized resin on a surface thereof, and (b) at least one (or in some embodiments at at least a pair of), platform support connected to or extending from the rotor base for each carrier platform, the platform supports configured to position each carrier platform on the rotor with the build surface oriented perpendicularly to a radius of the rotor and tangentially or parallel to an axis of rotation of said rotor.

In some embodiments, the rotor includes: (c) a catch pan support connected to or extending from the rotor base for each said carrier platform, each catch pan support configured to position each catch pan to face each corresponding carrier platform build surface so as to receive unpolymerized resin therein upon centrifugal separation from the light polymerized objects. Each catch pan support may include a pair of posts.

In some embodiments, each platform support includes a pair of opposing edge bumpers, and each catch pan includes a pair of opposing side edge flanges configured to engage at least one of the platform edge bumpers with the carrier platform sandwiched (or positioned) between the platform edge bumpers.

In some embodiments, each catch pan is configured so that the catch pans are secured to the rotor or rotor base by the securing of the carrier platforms to the rotor or rotor base.

In some embodiments, the rotor includes (d) a plurality of latch assemblies connected to the rotor base and configured to secure each carrier platform to the rotor base.

In some embodiments, the plurality of carrier platforms includes two, three, four, or five or more carrier platforms.

In some embodiments, each pair of platform supports includes a pair of outer bumpers, and a pair of opposite facing inner bumpers, configured to engage side handles on the carrier platform.

In some embodiments, the rotor has an axis of rotation, each catch pan includes a back wall, a pair of oppositely facing side walls connected to or extending from the back wall, and a bottom wall connected to or extending from the back wall and the side walls, the back wall having an inner surface and an outer surface;

with: (i) the back wall sloping radially outward with respect to an axis of rotation of said rotor as it approaches the bottom wall, and the bottom wall sloping downward as it approaches the back wall, to together define an acute angle and form a resin pool where centrifugally separated resin can accumulate (i.e., to facilitate resin collection, as in the embodiment of FIGS. 5-6), (ii) the back wall inner surface faces the axis of rotation and is concave with respect to the axis of rotation (i.e., to reduce aerodynamic drag during rotation, as in the embodiment of FIGS. 7-8), or (iii) a combination of (i) and (ii) (i.e., a compound or multi-layer back wall, the inner surfaces of which facilitate resin collection, as in the embodiment of FIGS. 5-6, and the outer surfaces of which are configured to reduce aerodynamic drag during rotation, as in the embodiment of FIGS. 7-8).

Some other embodiments of the present invention are directed to a catch pan for receiving residual resin separated from additively manufactured objects mounted on a rotor in a centrifugal separator, comprising: a back wall, a pair of oppositely facing side walls connected to or extending from the back wall, and a bottom wall connected to or extending from the back wall and the side walls, the back wall having an inner surface and an outer surface;

with: (i) the back wall sloping radially outward with respect to an axis of rotation of the rotor as it approaches said bottom wall, and the bottom wall sloping downward as it approaches the back wall, to together define an acute angle and form a resin pool where centrifugally separated resin can accumulate (i.e., to facilitate resin collection, as in the embodiment of FIGS. 5-6), (ii) the back wall inner surface faces said axis of rotation and is concave with respect to the axis of rotation (i.e., to reduce aerodynamic drag during rotation, as in the embodiment of FIGS. 7-8), or (iii) a combination of (i) and (ii) (i.e., a compound or multi-layer back wall, the inner surfaces of which facilitate resin collection, as in the embodiment of FIGS. 5-6, and the outer surfaces of which are configured to reduce aerodynamic drag during rotation, as in the embodiment of FIGS. 7-8).

In some embodiments, the catch pan further includes a top wall connected to or extending from the back wall and the side walls, the top wall having a heighth or being positioned at a height less than that of the side walls and configured to form (or the side wall and said top wall defining) a top access opening configured to receive therethrough a carrier platform having additively manufactured objects formed thereon.

In some embodiments, the catch pan further includes an upwardly facing lip connected to or extending from said bottom wall and said side walls, said lip configured to form a resin pool on said bottom wall beneath and/or behind said lip.

In some embodiments, the inner surface of said back wall faces said pool, and/or the catch pan further includes at least one alignment member connected to or on the outer surface and optionally configured to engage at least one catch pan support of said rotor.

Some other embodiments of the present invention are directed to a method of collecting residual resin from additively manufactured, light polymerized, objects, comprising: (a) providing a centrifuge having a rotor as described herein operatively associated therewith; (b) connecting a plurality of additively manufactured, light polymerized objects to the rotor, the objects having residual unpolymerized resin on a surface thereof; (c) centrifugally separating the residual resin from the objects into the catch pans; and (d) collecting the residual resin from the catch pans.

In some embodiments, the method further includes: (e) optionally combining said residual resin with additional resin; and then (f) stereolithographically producing at least one additional object from said centrifugally separated residual resin optionally combined with additional resin.

In some embodiments, the resin includes a dual cure resin.

In some embodiments, the object includes a lattice and/or includes one or more internal cavities and has at least one opening formed therein in fluid communication with the cavity or cavities and configured for excess resin within the cavity or cavities to flow therethrough and out of the cavity or cavities during the centrifugally separating step.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Stereolithography Apparatus and Resins.

Resins for additive manufacturing are known and described in, for example, U.S. Pat. Nos. 9,211,678; 9,205,601; and 9,216,546 to DeSimone et al. In addition, dual cure resins useful for carrying out some embodiments of the present invention are known and described in U.S. Pat. Nos. 9,676,963, 9,453,142 and 9,598,606 to Rolland et al., and in U.S. Pat. No. 10,316,213 to Arndt et al. Particular examples of suitable dual cure resins include, but are not limited to, Carbon Inc., elastomeric polyurethane, rigid polyurethane, flexible polyurethane, cyanate ester, and epoxy resins, all available from Carbon, Inc., 1089 Mills Way, Redwood City, Calif. 94063 USA.

Suitable additive manufacturing methods include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Januszewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017); L. Robeson et al., PCT Patent Pub. No. WO 2015/164234 (see also U.S. Pat. Nos. 10,259,171 and 10,434,706); C. Mirkin et al., PCT Patent Pub. No. WO 2017/210298 (see also US Pat. App. US 2019/0160733); B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

2. Resin Separation Apparatus.

Figure 1:
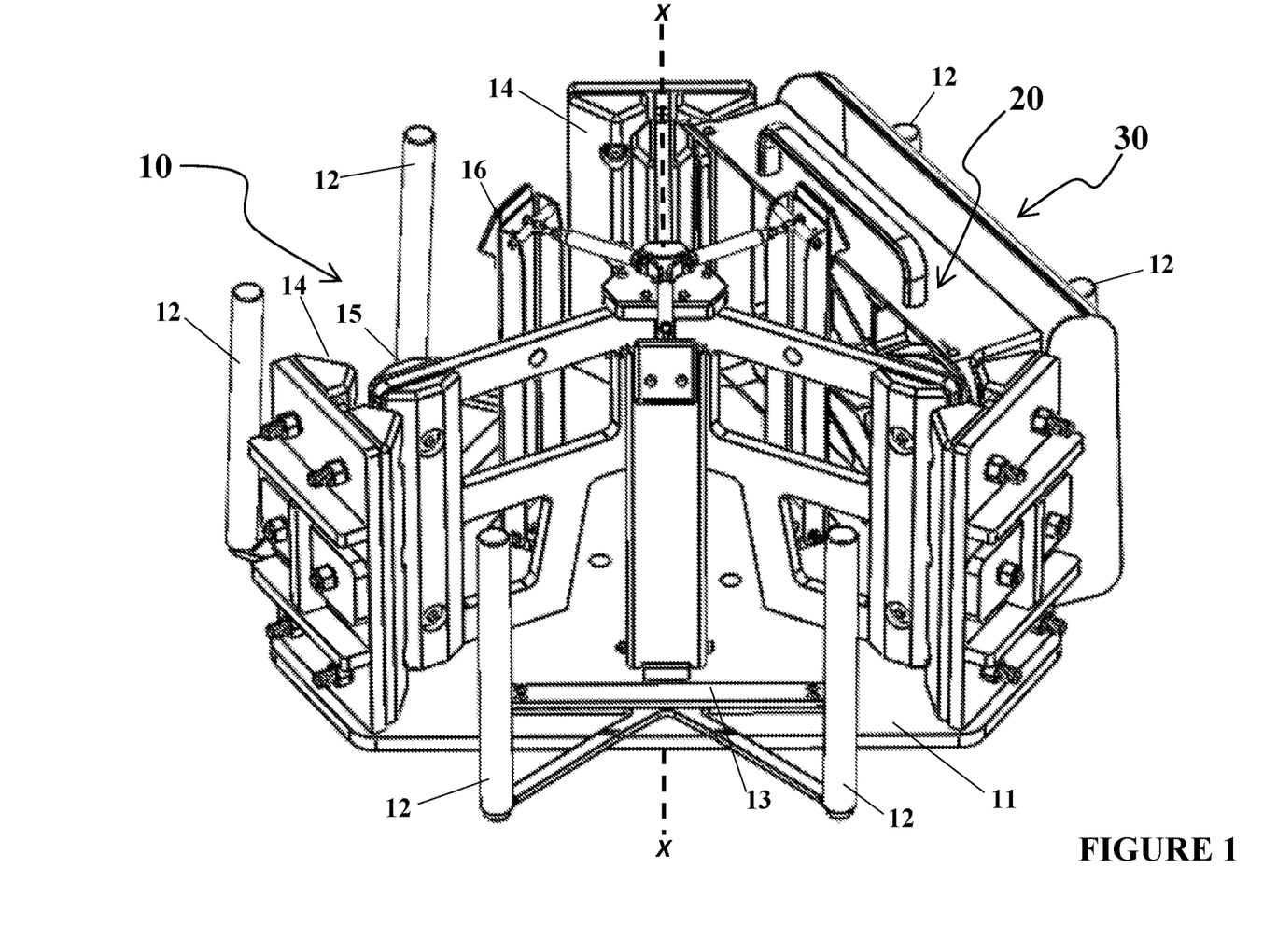
FIG. 1 is a perspective view of a rotor as described herein, this example configured for receiving three build platforms and corresponding catch pans, with one carrier platform and corresponding catch pan shown removably mounted to the rotor.
Figure 2:
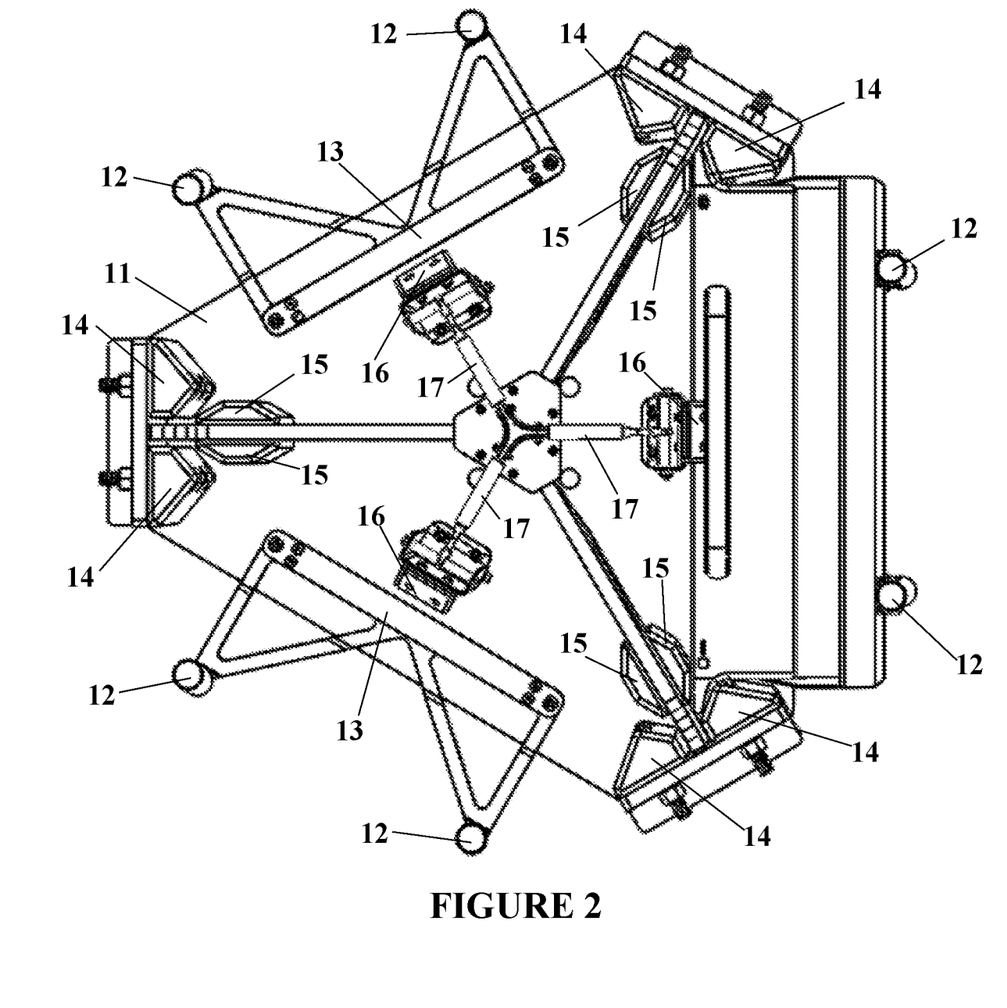
FIG. 2 is a top plan view of the assembly of FIG. 1.

FIGS. 1-2 illustrate an embodiment of a rotor assembly for centrifugally separating resin from additively manufactured objects. Such rotors and rotor assemblies can be used in any suitable centrifugal separation method and apparatus, including but not limited to those set forth M. Murillo and G. Dachs, Resin Extractor for Additive Manufacturing, PCT Patent Application Publication No. WO 2019/209732, the disclosure of which is incorporated by reference herein in its entirety.

In general, a rotor for separating residual resin from additively manufactured objects includes a rotor base and a plurality of engagement members configured to secure additively manufactured, light polymerized, objects to the rotor base, each object carrying unpolymerized resin on a surface thereof. The engagement members can directly engage the additively manufactured object (e.g., by clamping, by engaging connecting structures formed into the objects such as orifices that receive skewers, etc.), or can indirectly engage the objects (e.g., by engaging a carrier platform on which the objects were formed by additive manufacturing). In either scenario, in the present invention, one or a plurality of catch pans are removably connected to the base, with each catch pan configured to receive unpolymerized resin therein upon centrifugal separation of the resin from the additively manufactured, light polymerized, objects.

Figure 3:
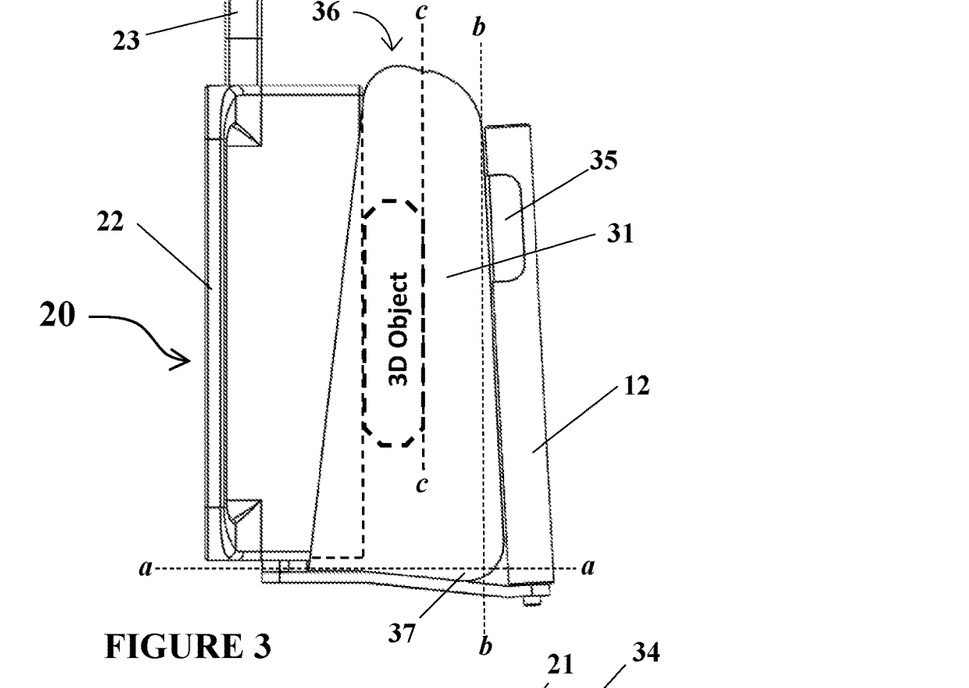
FIG. 3 is a side view of a subassembly of a carrier platform, catch pan, and selected rotor features, as shown in FIG. 1.
Figure 4:
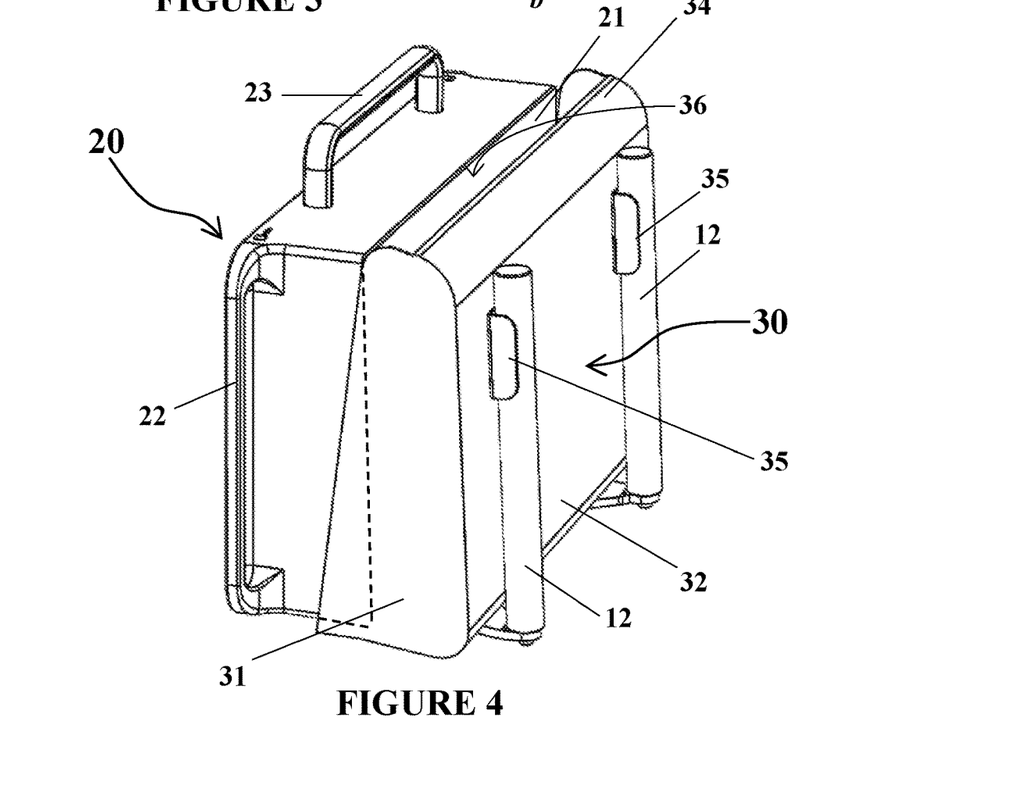
FIG. 4 is a perspective view of the subassembly of FIG. 3.
Figure 5:
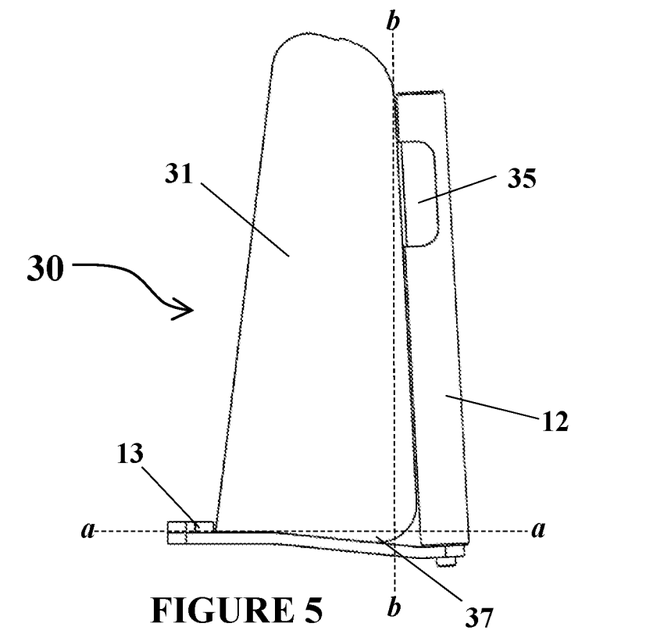
FIG. 5 is a side view of the subassembly of FIG. 3, without the carrier platform.
Figure 6:
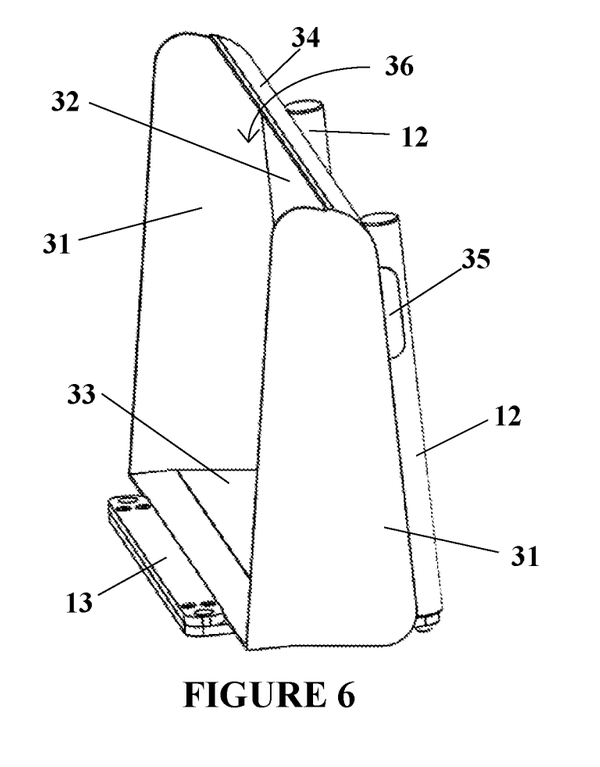
FIG. 6 is a perspective view of the subassembly of FIG. 5.

In the non-limiting embodiment of FIGS. 1-2, the assembly includes a rotor 10, a carrier platform 20, and a catch pan 30. The embodiment of FIGS. 1-2 is configured for receiving three carrier platforms and corresponding catch pans to achieve proper balance, but only one carrier and catch pan is shown in place for clarity. FIGS. 3-4 illustrate a portion or subsection of the rotor assembly, showing one of the three carrier platforms 20 in place with its corresponding catch pan 30 (FIGS. 5-6 are similar to FIGS. 3-4, but show the catch pan 30 only in place on a subsection of the rotor assembly, with the carrier platform removed).

The rotor 10 includes a rotor base 11 configured to receive a plurality of carrier platforms 20. Each carrier platform 20 has a build surface 21, and each build surface 21 may have at least one light polymerized object formed thereon from a light polymerizable resin by an additive manufacturing process. Each object may carry unpolymerized resin on a surface thereof.

The rotor 10 may include at least one (or in some embodiments at least a pair of), platform support connected to or extending from said rotor base for each carrier platform 20. The platform supports are configured to position each carrier platform 20 on the rotor 10 with the build surface 21 oriented perpendicularly to a radius of the rotor 10 and tangentially or parallel to an axis of rotation x of said rotor 10. In other words, the build surface 21 faces radially outwardly relative to the axis of rotation x.

The rotor 10 includes the carrier platform supports for each carrier platform 20, in the illustrated embodiment configured as a pair of outer bumpers 14 and a pair of inner bumpers 15 for each carrier platform (the carrier platform having side handles 22 in FIGS. 3-4, which can slide downward between the inner and outer bumper). A lower bumper 13 can be included for each carrier platform station to cushion the carrier platform 20 as it is slid or dropped into place between the bumpers. Note, however, that the carrier platform support can take a variety of different forms, such as a pair of skewers that slide through corresponding slots or orifices formed in the carrier platform, a single skewer (such as a rectangular skewer) that slides through a rectangular slot in the carrier platform, etc.

In one embodiment, the rotor base includes a catch pan support, which in the illustrated embodiment is in the form of a pair of posts 12. In alternative embodiments, the catch pan supports can take a different configuration, such as a a flat shelf, a pair of corner braces, etc., including combinations thereof. In an alternate embodiment discussed further below in connection with FIGS. 7-8, the catch pan 30 can be supported by the same supports as the carrier platform 20 and no additional catch pan supports need be included.

In some embodiments, there are a plurality of latch assemblies connected to the rotor 10 or rotor base 11 (preferably at least one for each carrier platform 20) and configured to secure each carrier platform 20 to the rotor 10 or rotor base 11. In the embodiment of FIGS. 1-2, the latch assemblies comprise a platform latch 16 that is pivotally connected to the rotor 10 or rotor base 11, and the platform latch 16 is biased radially outward by a mechanical spring or pneumatic spring cylinder 17 or the like. Note that alternative biasing mechanisms can also be employed, such as a polymer lattice spring, and that the biasing force can be exerted in the opposite direction by utilizing a fulcrum point on the platform latch.

Note also that, in the embodiments of FIGS. 1-8, the carrier platform, when latched or otherwise secured in place, sits on top of the lower wall, or lip, of the catch pan, such that the catch pan is configured so that the catch pans are secured to the rotor or rotor base by the securing of the carrier platforms to the rotor or rotor base. In some embodiments, each catch pan is configured so that the catch pans are secured to the rotor or rotor base by the securing of the carrier platforms to the rotor or rotor base.

Referring to FIGS. 5-6, the catch pan 30 includes a back wall 32, a pair of opposite side walls 31 connected to or extending from the back wall 32, and a bottom wall 33 connected to or extending from the back wall 32 and the side walls 31. The back wall 32 slopes radially outwardly with respect to the axis of rotation x of the rotor (FIG. 1) from a top portion to a bottom portion thereof. In other words, the back wall 32 slopes radially outwardly with respect to the axis of rotation x of the rotor as the back wall 32 approaches the bottom wall 33. This can be seen with reference to the vertical line b-b in FIG. 5. The bottom wall 33 slopes downwardly from a front portion to a rear portion thereof. In other words, the bottom wall 33 slopes downward as it approaches the back wall 32. This can be seen with reference to the horizontal line a-a in FIG. 5. The back wall 32 and the bottom wall 33 (or extensions or projections thereof) may define an acute angle. The back wall 32 and the bottom wall 33 together form a resin pool 37 where centrifugally separated resin can accumulate (i.e., to facilitate resin collection).

The catch pan 30 may include a top wall 34 connected to or extending from the back wall 32 and the side walls 31. The top wall 34 may be positioned at a height less than that of the (top of the) side walls 31. A top access opening 36 is defined by the side walls 31 and the top wall 34 for receiving therethrough a carrier platform having additively manufactured objects formed thereon.

The catch pan 30 may include at least one alignment member 35 on the outer surface of the back wall 32. As seen in FIG. 4, the alignment member(s) 35 may be configured to engage the at least one catch pan support of the rotor 10. For example, the alignment members 35 may be sized and configured to receive the posts 12 to help facilitate alignment of the catch pan and/or the carrier platform.

Figure 7:
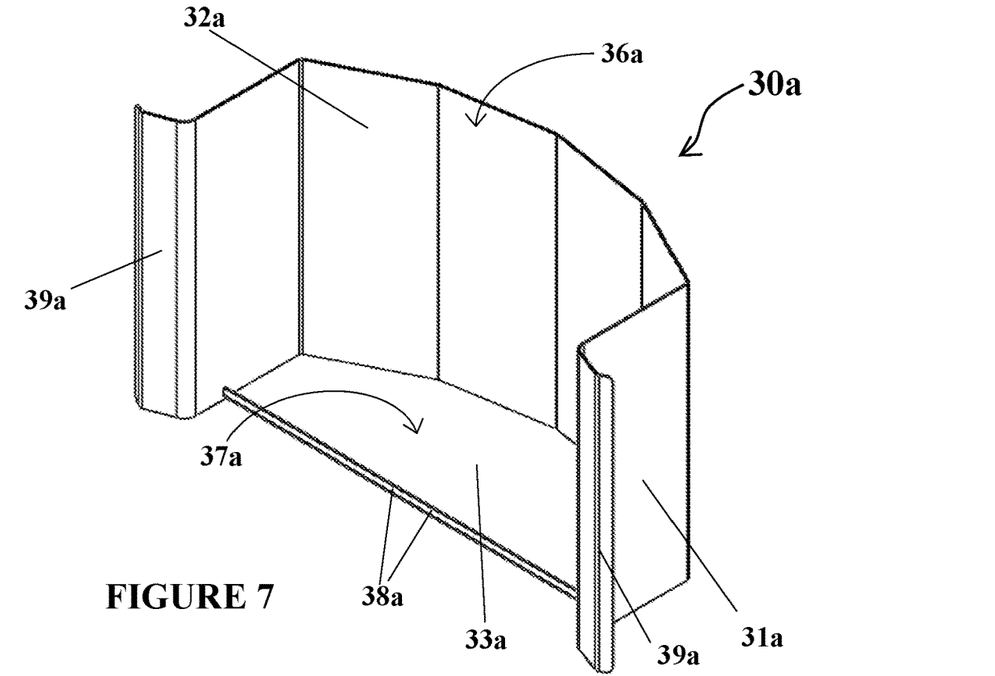
FIG. 7 is a front perspective view of an alternate embodiment of a catch pan of the present disclosure.
Figure 8:
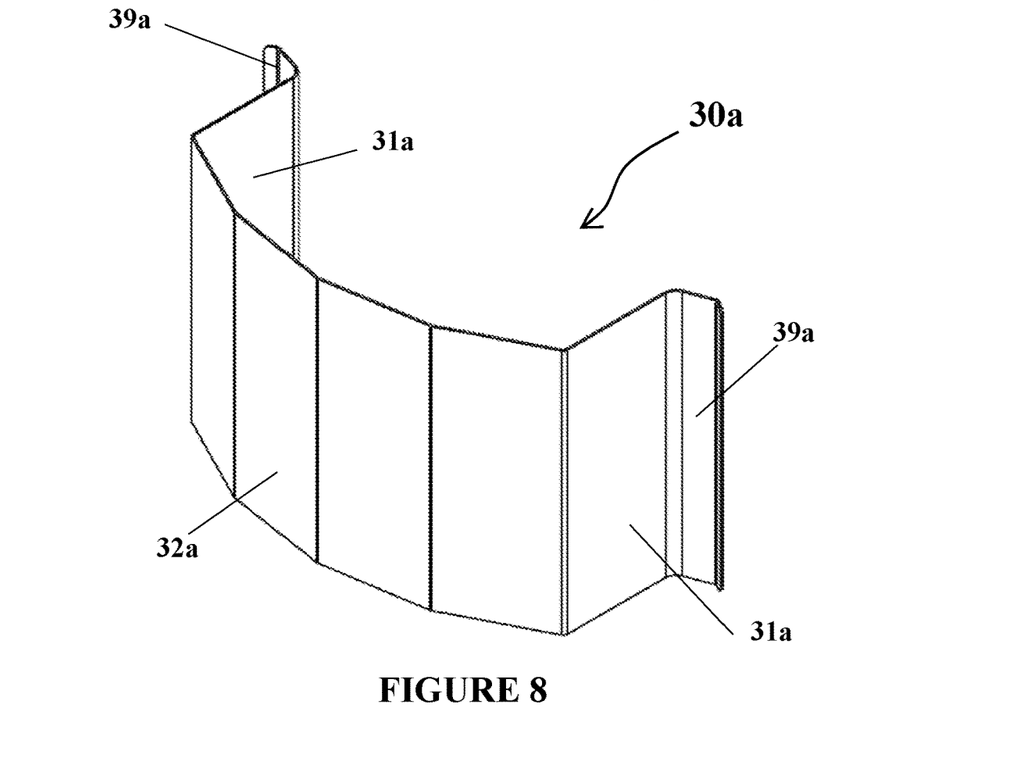
FIG. 8 is a rear perspective view of the catch pan of FIG. 7.

Referring to FIGS. 7-8, the catch pan 30a includes a back wall 32a, a pair of opposite side walls 31a connected to or extending from the back wall 32a, and a bottom wall 33a connected to or extending from the back wall 32a and the side walls 31a. The back wall 32a includes an outer surface and an opposite inner surface that faces the axis of rotation x (FIG. 1) and is concave with respect to the axis of rotation x. The configuration with the back wall being arcuate or curved may reduce aerodynamic drag during rotation of the rotor. This may manage or reduce the effect of wind on the additively manufactured objects while they are spinning.

The catch pan 30a may also include opposing side edge flanges 39a, with one each extending from a respective one of the side walls 31a. Each side edge flange 39a may be configured to be received between corresponding ones of the outer bumper 14 and the inner bumper 15 (FIGS. 1-2). In some embodiments, a lip extends from a terminal end of each flange, and the flange and the lip conform to and wrap around the outer bumper 14.

It is noted that, in the embodiment shown in FIGS. 7-8, the catch pan support such as the posts 12 may be omitted.

The catch pan 30a includes an upwardly extending or facing lip 38a extending from the bottom wall 33a and the side walls 31a. The lip 38a may extend upwardly from a front or front portion of the bottom wall 33a. The lip 38a is configured to form a resin pool 37a on the bottom wall 33a beneath and/or behind the lip 38a.

Figure 9:
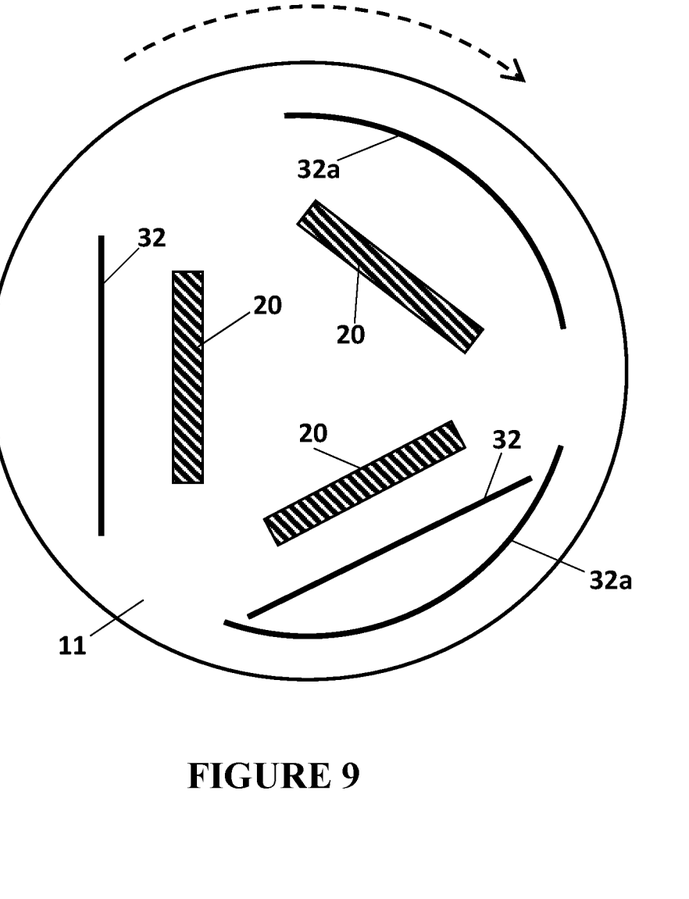
FIG. 9 is a top plan view illustrating catch pan configurations according to various embodiments.

FIG. 9 illustrates configurations for the catch pan (specifically, the back wall of the catch pan) according to various embodiments. It will be appreciated that the other components of the catch pans are not shown in the interest of clarity. The arrangement on the left corresponds to the embodiment of FIGS. 5-6, with the sloped straight back wall 32. The arrangement on the top corresponds to the embodiment of FIGS. 7-8, with the arcuate or curved back wall 32a. The arrangement on the bottom combines these other two embodiments, and includes the sloped straight back wall 32 and the arcuate or curved back wall 32*a*. In this latter embodiment, the back wall 32 (along with the side walls 31 and the bottom wall 33 shown in FIGS. 5-6) is configured to receive unpolymerized resin therein upon centrifugal separation of the resin from the additively manufactured, light polymerized, objects. The curved back wall 32*a* is positioned radially outwardly from the straight back wall 32 and is configured to reduce aerodynamic drag (e.g., on the objects being rotated).

3. Resin Separation Methods.

In use, a rotor as described above is mounted in a centrifuge, such as described above. Methods of separating light polymerized resin from additively manufactured objects can then include the steps of: (a) providing a centrifuge having a rotor as described above operatively associated therewith; (b) connecting a plurality of additively manufactured, light polymerized objects to the rotor, the objects having residual unpolymerized resin on a surface thereof; (c) centrifugally separating the residual resin from the objects the said catch pans; and (d) collecting the residual resin from the catch pans.

The additively manufactured objects can be produced by any suitable technique, and with any suitable resin, such as those described in connection with stereolithography methods and apparatus above. In some embodiments, dual cure resins are preferred. The step of connecting the additively manufactured, light polymerized objects to the rotor can be carried out by any suitable technique, including mounting the objects directly to the rotor, or mounting build platforms carrying the objects to the rotor, as described in connection with apparatus above.

While the collected resin can simply be discarded, the method preferably further includes the steps of: (e) optionally combining said residual resin with additional resin; and then (f) stereolithographically producing at least one additional object from the centrifugally separated residual resin (which has optionally been combined with additional resin).

Those skilled in the art will appreciate objects that are suitable for cleaning by centrifugal separation, as opposed to other techniques such as washing. In some embodiments, suitable objects for cleaning by the methods and apparatus described herein comprise a lattice and/or includes one or more internal cavities and have at least one opening formed therein in fluid communication with the cavity or cavities and configured for excess resin within the cavity or cavities to flow therethrough and out of the cavity or cavities during the centrifugally separating step. Particular examples of such products include, but are not limited to, footwear soles and midsoles, cushions such as seat cushions, saddles, helmet liners, body pads such as for protective glove, kneepad, and shoulder pad inserts and the like, shock absorbing and impact absorbing lattices such as for automotive and aerospace applications, small parts such as electrical connectors, and the like.

The foregoing is illustrative of the present invention, and is not to be construed as limiting thereof. The invention is defined by the following claims, with equivalents of the claims to be included therein.

We claim:

1. A rotor for separating residual resin from additively manufactured objects in a centrifugal separator, the rotor including a rotor base and a plurality of engagement members configured to secure additively manufactured, light polymerized, objects to said rotor base, each object carrying unpolymerized resin on a surface thereof, the improvement comprising:

a plurality of catch pans removably connected to said rotor base, each of the plurality of catch pans configured to receive unpolymerized resin therein upon centrifugal separation of the resin from the additively manufactured, light polymerized, objects.

2. The rotor of claim 1, comprising:

(a) said rotor base configured to receive a plurality of carrier platforms, each of the plurality of carrier platforms having a build surface, each build surface having at least one light polymerized object formed thereon from a light polymerizable resin by an additive manufacturing process, each object carrying unpolymerized resin on a surface thereof, and (b) at least one platform support connected to or extending from said rotor base for each said carrier platform, said platform supports configured to position each said carrier platform on said rotor with said build surface oriented perpendicularly to a radius of the rotor and tangentially or parallel to an axis of rotation of said rotor.

3. The rotor of claim 2, further comprising:

(c) a catch pan support connected to or extending from said rotor base for each said carrier platform, each said catch pan support configured to position each catch pan to face each corresponding carrier platform build surface so as to receive unpolymerized resin therein upon centrifugal separation from said light polymerized objects.

4. The rotor of claim 3, wherein each said catch pan support comprises a pair of posts.

5. The rotor of claim 2, wherein each said platform support comprises a pair of opposing edge bumpers, and each catch pan includes a pair of opposing side edge flanges configured to engage at least one of said platform edge bumpers with said carrier platform sandwiched (or positioned) between said platform edge bumpers.

6. The rotor of claim 1, wherein each said catch pan is configured so that said catch pans are secured to said rotor or rotor base by the securing of said carrier platforms to said rotor or rotor base.

7. The rotor of claim 2, further comprising:

(d) a plurality of latch assemblies connected to said rotor base and configured to secure each said carrier platform to said rotor base.

8. The rotor of claim 2, wherein said plurality of carrier platforms comprises two, three, four, or five or more carrier platforms.

9. The rotor of claim 2, wherein each pair of platform supports comprises a pair of outer bumpers, and a pair of opposite facing inner bumpers, configured to engage side handles on said carrier platform.

10. The rotor of claim 1, wherein said rotor has an axis of rotation, each said catch pan comprises a back wall, a pair of oppositely facing side walls connected to or extending from said back wall, and a bottom wall connected to or extending from said back wall and said side walls, said back wall having an inner surface and an outer surface;

with: (i) said back wall sloping radially outward with respect to an axis of rotation of said rotor as it approaches said bottom wall, and said bottom wall sloping downward as it approaches said back wall, to together define an acute angle and form a resin pool where centrifugally separated resin can accumulate, (ii) said back wall inner surface faces said axis of rotation and is concave with respect to said axis of rotation, or (iii) a combination of (i) and (ii).

11. A catch pan for receiving residual resin separated from additively manufactured objects, said catch pan mounted on a rotor in a centrifugal separator, said catch pan comprising:
- a back wall, a pair of oppositely facing side walls connected to or extending from said back wall, and a bottom wall connected to or extending from said back wall and said side walls, said back wall having an inner surface and an outer surface;
- with: (i) said back wall sloping radially outward with respect to an axis of rotation of said rotor as it approaches said bottom wall, and said bottom wall sloping downward as it approaches said back wall, to together define an acute angle and form a resin pool where centrifugally separated resin can accumulate, (ii) said back wall inner surface faces said axis of rotation and is concave with respect to said axis of rotation, or (iii) a combination of (i) and (ii).

12. The catch pan of claim 11, further comprising a top wall connected to or extending from said back wall and said side walls, said top wall having a heighth or being positioned at a height less than that of said side walls and configured to form (or said side wall and said top wall defining) a top access opening configured to receive therethrough a carrier platform having additively manufactured objects formed thereon.

13. The catch pan of claim 11, further comprising an upwardly facing lip connected to or extending from said bottom wall and said side walls, said lip configured to form a resin pool on said bottom wall beneath and/or behind said lip.

14. The catch pan of claim 11, said inner surface of said back wall facing said pool, said catch pan further comprising at least one alignment member connected to or on said outer surface and optionally configured to engage at least one catch pan support of said rotor.

15. A method of collecting residual resin from additively manufactured, light polymerized, objects, comprising:
- (a) providing a centrifuge having the rotor of claim 1 operatively associated therewith;
- (b) connecting a plurality of additively manufactured, light polymerized objects to said rotor, said objects having residual unpolymerized resin on a surface thereof;
- (c) centrifugally separating said residual resin from said objects into said catch pans; and
- (d) collecting said residual resin from said catch pans.

16. The method of claim 15, further comprising:
- (e) optionally combining said residual resin with additional resin; and then
- (f) stereolithographically producing at least one additional object from said centrifugally separated residual resin optionally combined with additional resin.

17. The method of claim 15, wherein said resin comprises a dual cure resin.

18. The method of claim 15, wherein said object comprises a lattice and/or includes one or more internal cavities and has at least one opening formed therein in fluid communication with the cavity or cavities and configured for excess resin within the cavity or cavities to flow therethrough and out of the cavity or cavities during the centrifugally separating step.

* * * * *